United States Patent [19]

Willinger

[11] 4,336,640
[45] Jun. 29, 1982

[54] CYLINDRICAL TURNING TOOL

[75] Inventor: Karl Willinger, Vienna, Austria

[73] Assignee: Miba Sintermetall Aktiengesellschaft, Laskirchen, Austria

[21] Appl. No.: 198,443

[22] Filed: Oct. 20, 1980

[30] Foreign Application Priority Data

Nov. 5, 1979 [AT] Austria ............................... 7083/79

[51] Int. Cl.³ ...................... B23D 71/00; B21K 21/00
[52] U.S. Cl. ................................... 29/79; 76/101 SM
[58] Field of Search ...................... 29/78, 79; 76/101 S

[56] References Cited

U.S. PATENT DOCUMENTS

| | | | |
|---|---|---|---|
| 4,021,899 | 5/1977 | Jensen | 29/79 |
| 4,091,516 | 5/1978 | Jensen et al. | 29/79 |
| 4,283,819 | 8/1981 | Willinger | 29/79 |
| 4,283,820 | 8/1981 | Willinger | 29/79 |
| 4,287,648 | 9/1981 | Hineborg | 29/79 |

Primary Examiner—Harrison L. Hinson
Attorney, Agent, or Firm—Kurt Kelman

[57] ABSTRACT

The tool for machining pneumatic tires for vehicles comprises a plurality of peripherally consecutive, segment-shaped cutter blades, which constitute a peripheral surface of the tool and are axially spaced apart and extend in planes that are transverse to the axis of the tool. Each of said blades has a radially outer edge and cutting tools carried by said outer edge. The radially outer edge of each of said blades comprises at least one tooth-carrying edge portion which is bent out of the plane of said blade. Peripherally consecutive ones of said tooth-carrying edge portions of said tool are bent out to opposite sides.

4 Claims, 7 Drawing Figures

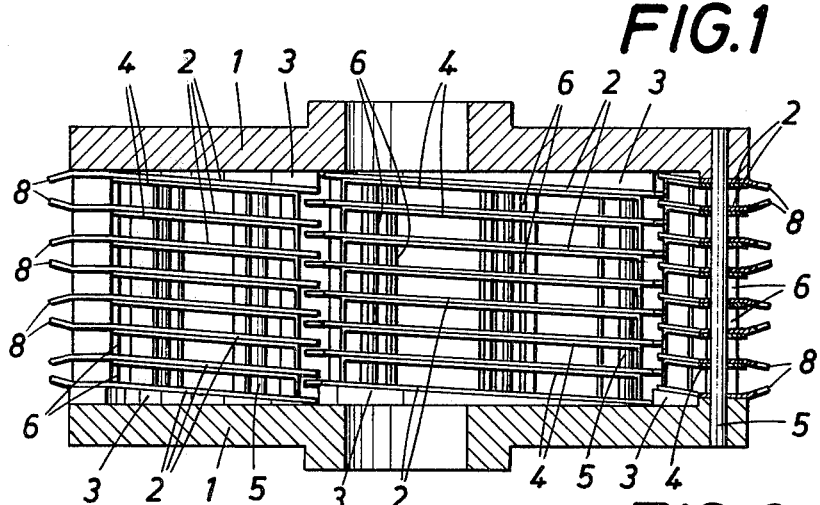
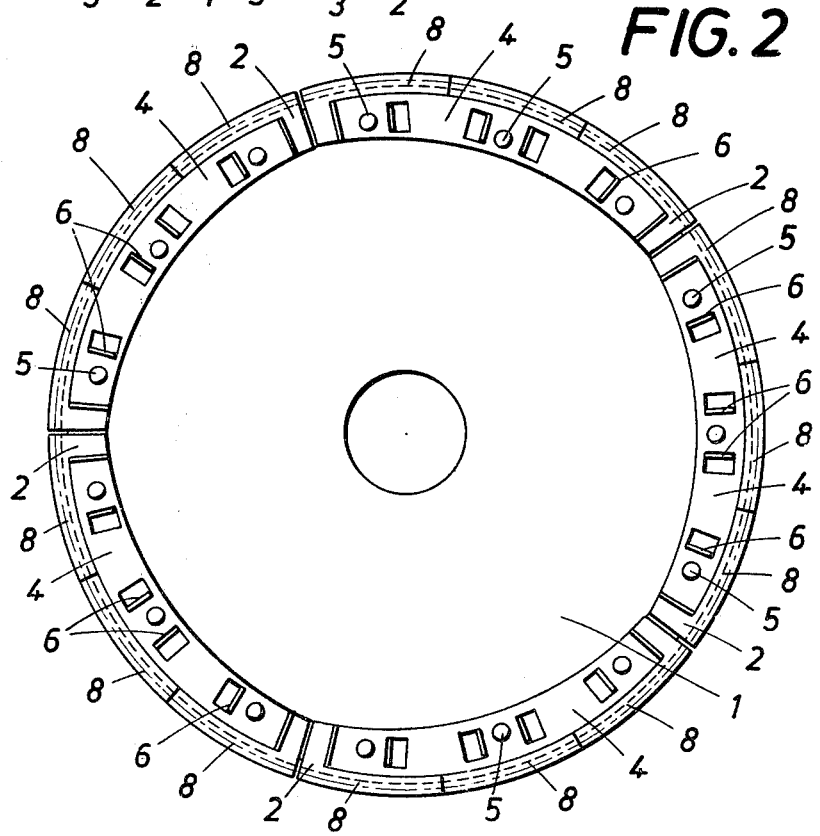

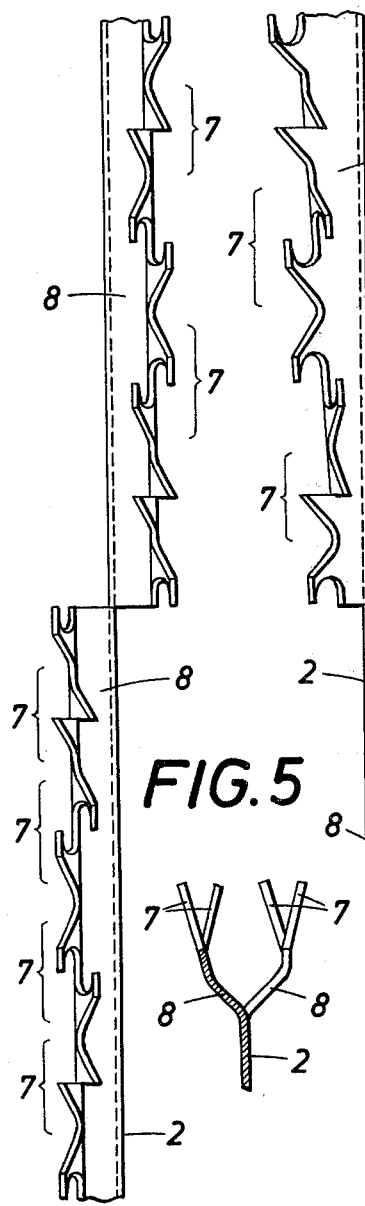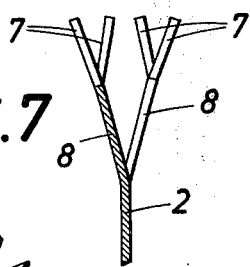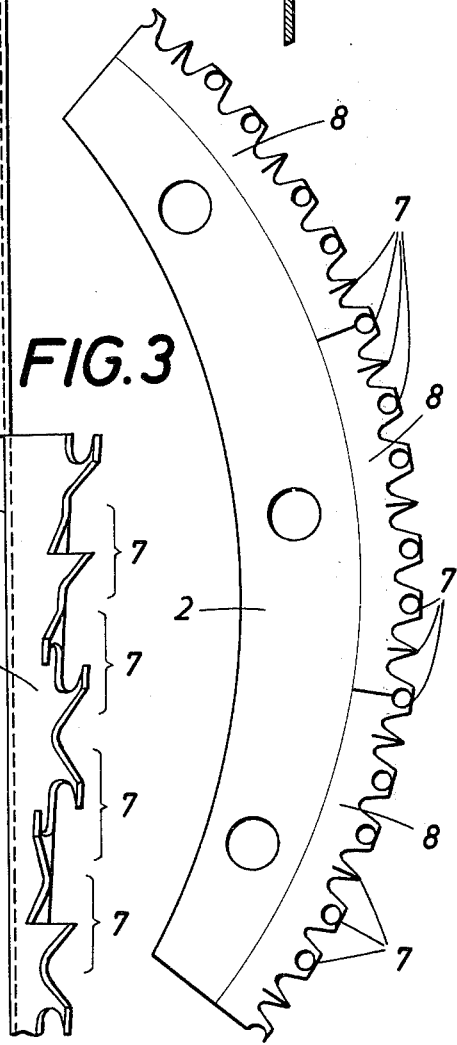

CYLINDRICAL TURNING TOOL

This invention relates to a cylindrical turning tool for machining pneumatic tires for vehicles, comprising peripherally consecutive, segment-shaped cutter blades, which are axially spaced apart and constitute the peripheral surface of the tool and extend in planes which are transverse to the axis of the tool and carry teeth at their radially outer edge.

When a pneumatic tire is to be retreated, the rubber layer is removed to provide the tire with a surface which has a comparatively fine rough pattern for the subsequent vulcanization. For this reason, the preparation of a pneumatic tire to be retreated involves the problem that a fine rough pattern is desired whereas a machining operation for a rapid removal of material will inevitably result in a coarse rough pattern. Whereas the formation of a fine rough pattern would be promoted by the use of a turning tool having cutter blades provided with a larger number of teeth, the teeth of such tool will not penetrate the material to be removed to a large depth and will have only a relatively low cutting power. Besides, the friction between the tool and the workpiece increases with the number of teeth which have entered the material to be removed, and the smaller tooth spacing will obstruct the supply of cooling air. For this reason, limits are imposed regarding the number of teeth of economically usable turning tools also with a view to the generation of heat and the risk of a self-ignition of the tires. It has been suggested that a finer rough pattern could be obtained with a given number of teeth if alternate teeth of a cutter blade are bent to opposite sides out of the plane of the blade. Whereas this measure has the result that the furrows cut by the several teeth are distributed over a larger area, this result is not yet satisfactory. Above all, it has been found out that the desirable influence of teeth which are bent out to opposite sides of the blade on the rough pattern will decrease strongly after a short time of use. This is probably due to the fact that the axial spacing of the tips of the teeth spaced around the periphery of the blade decreases quickly as the teeth are worn because the teeth must be slender in order to reduce the friction of strength must not exceed a certain height so that they cannot be bent to a large extent out of the plane of the blade. Because a satisfactory rough pattern can be obtained with these known teeth only as long as the wear of the teeth is within a restricted range, the service life of these known blades is relatively short.

Besides, an adaptation of the turning tool to different operating conditions is possible only by a replacement of blades so that the use of different tooth shapes will produce different results as regards cutting power and rough pattern.

It is an object of the invention to avoid these disadvantages of the known blades and so to improve a turning tool of the kind described first hereinbefore that a relatively fine rough pattern can be obtained by the use of blades having a high cutting power and a long service life. Besides, the turning tool should be adapted to produce different results with blades of the same kind.

This object is accomplished according to the invention in that the radially outer edge of each blade comprises at least one tooth-carrying edge portion which is bent out of the plane of the blade and peripherally consecutive ones of said tooth-carrying edge portions are bent out to opposite sides. Because the tooth-carrying outer edge portion of each blade rather than the individual teeth is bent out of the plane of the blade, a relatively large spacing of the tooth tips of the edge portions bent to opposite sides of the blades can be ensured whereas an adequate strength is ensured. This will obviously result also in a desirable distribution of the furrows cut by the individual teeth over a correspondingly larger width so that a much finer rough pattern can be obtained with a given number of teeth whereas the cutting power is not reduced. The service life of each blade will not be adversely affected because the radial spacing of the teeth disposed on different sides of the blade is decreased only to a small extent compared with the axial spacing. For this reason the rough pattern will not be adversely affected by the wear of teeth more strongly than with blades having no bent-out edge portions and will be much more favorable initially. As has been explained hereinbefore, that advantage is due to the improved axial distribution of the furrows cut by the individual teeth of the turning tool and will be obtained regardless of the shape of the teeth. It is understood that the rough pattern will be strongly influenced by the shape of the teeth used.

The axial distribution of the furrows cut by the individual teeth will also depend on whether corresponding tooth-carrying edge portions of axially adjacent individual blades extend toward each other or away from each other. The tooth spacing will be smaller when the tooth-carrying edge portions of the blades are bent toward each other than when they are bent away from each other and a finer rough pattern will be obtained in the former case. To permit a large number of combinations with the use of blades of a single kind, a further preferred feature resides in that each blade comprises an odd number of tooth-carrying edge portions and alternate tooth-carrying edge portions of each blade are bent out to opposite sides of the blade. When a blade having alternate tooth-carrying edge portions bent out to opposite sides is side-inverted whereas an adjacent blade of the same kind remains in position, tooth-carrying edge portions which faced each other before one blade was side-inverted will now be remote from each other and tooth-carrying edge portions which were remote from each other before one blade was side-inverted will now face each other. It is apparent that widely different tooth patterns can be obtained in that individual blades are side-inverted so that the turning tool can be adapted to widely different conditions without requiring a use of different blades. In this respect, particularly desirable conditions will be obtained if each individual blade has three tooth-carrying portions of equal length. Alternatively, each blade may be bent out only to one side throughout its peripheral length.

An even finer distribution of cut furrows can be obtained if alternate teeth of blades according to the invention are also bent out to opposite sides.

According to a further preferred feature of the invention, the same object is served by an arrangement in which the extent to which the tooth-carrying edge portions of the outer edge of each blade are bent out of the plane of the blade increases from one length end of the blade to the other. A different spacing of the tooth tip from the plane of the blade will obviously result in a more/uniform distribution of the cut furrows over the axial length of the turning tool.

The subject matter of the invention is shown by way of example on the accompanying drawing, in which:

FIG. 1 is an axial sectional view showing a turning tool according to the invention, FIG. 2 is a side elevation showing that turning tool with one end plate removed;

FIG. 3 is a side elevation showing a segment-shaped blade of the turning tool;

FIG. 4 is a top plan view showing a blade having tooth-carrying edge portions bent out to opposite sides of the blade;

FIG. 5 is a transverse sectional view showing the blade of FIG. 4;

FIG. 6 is a view similar to FIG. 4 showing another embodiment of a blade, and

FIG. 7 is a transverse sectional view showing the blade of FIG. 6.

As is apparent from FIGS. 1 and 2, the turning tool shown comprises in conventional matter two end plates 1 and peripherally consecutive, axially spaced apart, segment-shaped individual cutter blades 2 disposed between the end plates and constituting the peripheral surface of the turning tool. If each blade does not extend in a plane that is normal to the axis, as is apparent in FIG. 1, the blades at the ends of the blade set will bear on mating shoulders 3 of the end plates 1. Spacers 4 are provided between adjacent blades and together with the blades are threaded on axially parallel rods 5, which extend between the end plates 1. In the present embodiment, each spacer consists of a segment-shaped metal strip having struck out spacing lugs 6. It will be understood, that different spacers may be used.

The tool differs from conventional turning tools of this kind in that the radially outer edge of each blade 2 has at least one tooth-carrying edge portion 8, which is bent out the plane of the blade and peripherally consecutive ones of said tooth-carrying edge portions 8 are bent out to opposite sides as is clearly apparent from FIGS. 4 to 7. The radially outer edge of each blade 2 carries the teeth 7. In the embodiment shown, the radially outer edge of each blade 2 has three tooth-carrying edge portions 8 of equal length so that when a blade is side-inverted those tooth-carrying edge portions 8 which faced corresponding tooth-carrying edge portions 8 of an adjacent blade before one blade was side-inverted are now remote from the corresponding tooth-carrying edge portions 8 of such adjacent blade. In this way, the distribution of teeth over the peripheral surface of the turning tool can be varied as desired so that the tool can be adapted for use under widely differing conditions simply by a side inversion of blades.

The use of blades having tooth-carrying edge portions 8 which are bent out of the plane of the blade to opposite sides resides in that the furrows cut by the individual teeth 7 are distributed much more desirably over the axial length of the turning tool so that a finer rough pattern is necessarily obtained. The tooth-carrying edge portions 8 bent out of the plane of the blade may be angled in themselves, as is shown in FIG. 5, or straight, as is shown in FIG. 7. If alternate teeth 7 of a given tooth-carrying edge portion 8 are also bent out to opposite sides—such teeth may be straight or angled—it will be possible to obtain a particularly fine rough pattern without a risk of a generation of excessive heat because that finer rough pattern was obtained without an increase of the number of teeth. Only the distribution of teeth is greatly improved by the measures proposed according to the invention.

A particularly uniform distribution of the furrows cut by the teeth throughout the axial length of the turning tool can be obtained if the extent to which the tooth-carrying edge portions 8 of each blade 2 are bent out of the plane of the blade increases from one length end of the blade to the other, as is shown in FIG. 6.

What is claimed is:

1. In a cylindrical turning tool for machining pneumatic tires for vehicles, which tool comprises a plurality of peripherally consecutive, segment-shaped cutter blades, which constitute a peripheral surface of the tool and are axially spaced apart and extend in planes that are transverse to the axis of the tool, each of said blades having a radially outer edge and cutting teeth carried by said outer edge, the improvement residing in that said radially outer edge of each of said blades comprises at least one tooth-carrying edge portion which is bent out of the plane of said blade, and peripherally consecutive ones of said tooth-carrying edge portions of said tool are bent out to opposite sides.

2. The improvement set forth in claim 1, wherein said radially outer edge porton of each of said blades comprises an odd number of said tooth-carrying edge portions and alternate of said tooth-carrying edge portions of each of said blades are bent out to opposite sides of the plane of said blade.

3. The improvement set forth in claim 2, wherein said radially outer edge of each of said blades comprises three of said tooth-carrying edge portions, which are of equal length.

4. The improvement set forth in claim 1, wherein said radially outer edge of each of said blades comprises a plurality of said tooth-carrying edge portions, and the extent to which said tooth-carrying edge portions of said radially outer edge of each of said blades protrude from the plane of said blade increases from one length end of the blade to the other.

* * * * *